Feb. 4, 1936.  O. C. DENNIS  2,029,415
PICTURE DISPLAY DEVICE
Filed May 24, 1934
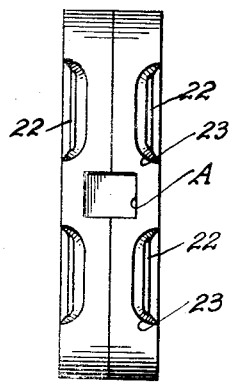
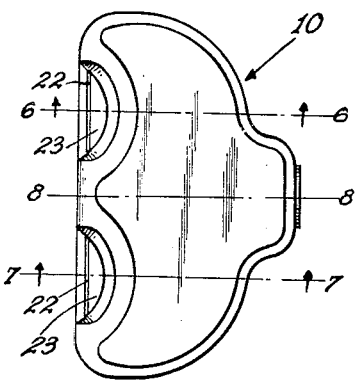
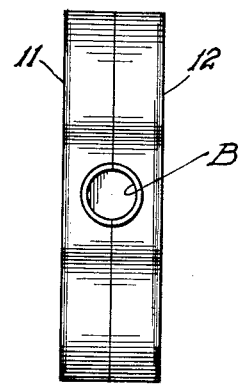
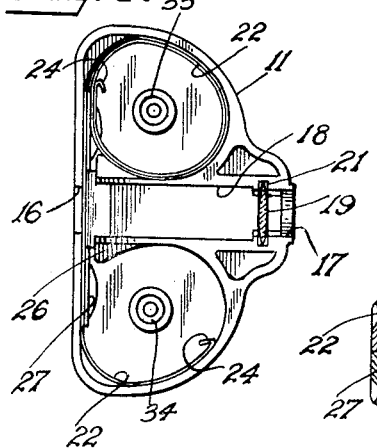
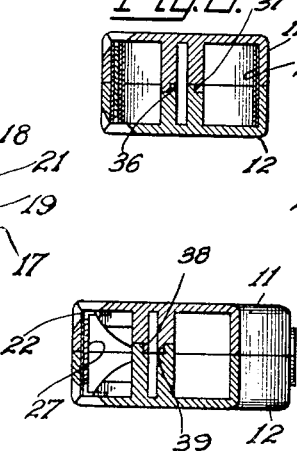
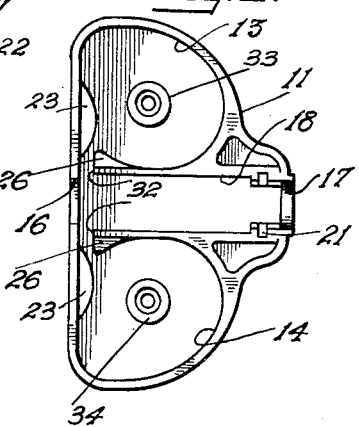
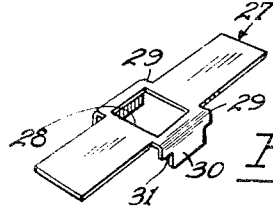
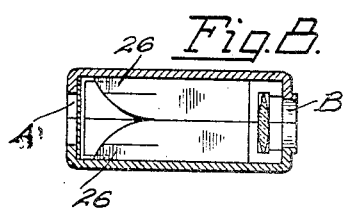
Inventor:
Oliver C. Dennis
By George E. Mueller
Atty Patented Feb. 4, 1936

2,029,415

UNITED STATES PATENT OFFICE 2,029,415

PICTURE DISPLAY DEVICE

Oliver C. Dennis, Wilmette, Ill.

Application May 24, 1934, Serial No. 727,308

4 Claims. (Cl. 40—28)

My invention relates in general to picture display devices and in particular to a small film carrying device for holding in the hand, to be operated by the fingers.

Various small film display structures are in use at the present time, but in most of these devices their utility is somewhat limited by their size, and the mechanism employed in each case is complicated enough to increase the cost of the entire device beyond that which would be warranted in view of its limited utility and novelty. In each of these devices mechanical means are provided for moving the film across a viewing aperture. Inasmuch as most of these employ a sprocket wheel arrangement for accomplishing the movement of the film, the film itself must be perforated along the edges to receive the teeth of the sprocket wheel. This of course somewhat increases the cost of the film, and in turn adds to the cost of the entire device.

It is an object of my invention to provide an improved picture display device.

A further object is to provide a small, simple device of this character which will require no mechanical structure for moving the film therein.

One of the features of my invention is that the film may be moved across the film viewing aperture simply by engaging said film directly by the fingers.

A still further object of my invention is to provide a very simple casing for the film which may be cast in a mold with the use of the ordinary molding compounds, and It is also an object to provide a low-cost, sturdy device which is attractive in appearance and novel in operation.

Other objects and advantages will be apparent from the following description taken with the drawing, in which:

Fig. 1 is a side elevation of my assembled casing.

Fig. 2 is a front elevation thereof.

Fig. 3 is an elevation of the rear of the casing.

Fig. 4 is a plan view of the device with one of the two parts of the casing removed.

Fig. 5 is a plan view similar to that of Fig. 4, with the film strip, removable guide plate and lens removed from said casing.

Fig. 6 is a sectional view along the line 6—6 of Fig. 1.

Fig. 7 is a sectional view along the line 7—7 of Fig. 1, looking in the direction of the arrows.

Fig. 8 is a sectional view along the line 8—8 of Fig. 1; and

Fig. 9 is a perspective view of the removable film guide plate.

In practicing my invention I provide a small casing for carrying a picture film with said casing having corresponding film lighting and film viewing apertures on opposite sides thereof, and film guide means in the casing. The device is adapted to be held in one hand, and placed with the film viewing aperture to one eye of the operator. Openings are provided in the casing permitting engagement of the fingers directly with the film to move the film across the line of vision through the viewing aperture.

Small devices to be carried in the hand for displaying picture film strips have become popular in recent years for the purpose of displaying scenic views, and other pictures lending themselves to collection in a series. Most of these devices, although perhaps enjoying a popular acceptance, have been limited in their sales because of the high cost as compared to the utility and entertainment value of the devices. Means for moving and guiding the film within the casing ordinarily required a number of stamped metal parts, in addition to parts of the casing, and because of this considerable number of parts, the cost of material and assembly amounted to an appreciable sum. As illustrated in the drawing, and as will be hereinafter described, I overcome these difficulties by providing a molded casing 10 consisting of a pair of correspondingly shaped, fitted members 11 and 12. The ordinary molding compounds have been found suitable for the casing.

Each of the molded sections 11 and 12 includes a film carrying compartment 13 at the top thereof, and a second film carrying compartment at the bottom. A semi-circular slot 16 is provided in each of the sections, and when assembled provides a film-lighting aperture A as shown in Fig. 2. At the rear of each section a semi-circular portion 17, when fitted together comprises the film-viewing aperture B shown in Fig. 3. A passageway 18 for the transmission of light is provided transversely of the casing between the two apertures and intermediate the film-carrying compartments 13 and 14. A lens 19 carried in slots 21 adjacent the aperture 17 improves the visibility when viewing the film.

A film strip 22 is carried freely in the casing and moved from compartment 13 to compartment 14 or vice versa solely by engagement of the fingers of the operator with the edge of the film. This is accomplished by providing openings 23 on each edge of the front face of the casing and above and below the aperture A as shown in Figs. 1 and 2. The openings are shaped so that the edge of the film 22 projects far enough into the same to permit gripping of the edge by the fingers. Inasmuch as only the edge is gripped, no injury can result to the film, and with the film carried freely in the casing only a very slight pressure of the fingers is necessary to move the film. This construction obviates the necessity of any film moving mechanism such as has formerly been employed as well as the perforated film.

The small film strip employed in a device of this character is originally supplied in an elongated, flat piece. Ordinarily it is necessary to form the film in a separate operation to produce the curled configuration necessary to feed it from one compartment to the other. In my device, however, I provide film guideways which in themselves will direct the film 22 so that it may be rolled in its straight form with the ends bent at 24, inserted in the casing, and then directed from one compartment to the other by means of such guideways. The guiding is accomplished by a curved wall in each compartment as shown particularly in Fig. 5, with a short curved projection 26 integral with the walls of the passage 18 to curve the end of the film slightly as it passes this point. The operation of this will be apparent from a consideration of Fig. 4, wherein the film 22 is shown with its ends 24 at different positions in its movement from compartment 13 to compartment 14, or vice versa.

Further guidance of the film is provided in the removable plate 27 which includes an elongated body portion apertured at 28 intermediate the ends thereof, and having an outwardly and rearwardly extending ear 29 at each side of said aperture. The rearward portion 30 of the ears 29 is indented at 31 to form a pair of stops adapted to engage the ends of the walls of the passage 18 when the plate is assembled in guiding position in the casing. The walls terminate at 32 so as to provide a narrow passage between the wall of the casing and these end points 32.

In assembling the film in the casing it is rolled a sufficient amount to fit into one compartment, and the outer end thereof pulled into the other compartment so as to extend past the aperture 16 as shown in Fig. 4. The guide plate 27 is then inserted in back of the film with the ears 29 fitting into the passage 18 in their rearwardly extending portions 30 with the stops 31 resting against the walls' ends 32. The two members 11 and 12 are then fitted together and the guide plate is held firmly in position so as to guide the film across the aperture 16 and hold it at the openings 23. The two members 11 and 12 are secured together by means including a pair of fitted posts 33 and 34 extending vertically in the center of each of the compartments 13 and 14 respectively. One of the two halves of the post 33 has a projection 36 thereon adapted to fit in a corresponding cavity 37 in the other half (Fig. 6). Post 34 has a similar projection 38 and a corresponding cavity 39 as shown in Fig. 7. Just before fitting the two parts together a drop of cement is placed in a cavity to retain the corresponding projection when it is inserted therein. It is understood that other means may be employed, such as a removable pin extending through the posts, or a screw, to secure the two halves of the casing together, but the cemented locking provides a very inexpensive means adapted for rapid assembly.

In view of the exceptionally low cost of the manufacture of my device it has found favor as an advertising medium, and in such use it has been found more advisable to cement the two parts of the casing together so that the film carrying the advertising message cannot be removed.

A rather long section of film may be used, with the length limited only by the size of each of the carrying compartments 13 and 14. The device is very neat appearing, and being made with molding compounds it is possible to get any desired shape, color or design for the exterior of the casing.

Although I have shown my invention in its preferred embodiment, I do not limit myself thereby, but limit it only by the scope of the appended claims.

I claim:

1. In a picture display device, a bi-part molded casing having two correspondingly shaped members for fitting together to provide film carrying compartments at the top and bottom of said casing, a film carried in the compartment, a removable guide plate for guiding the film from one compartment to the other, a film-viewing aperture at one side of the casing, and a film-lighting aperture at the other, and means permitting finger movement directly on the film to move said film from one compartment to the other.

2. In a picture display device, a molded casing comprising a pair of correspondingly shaped members adapted to fit together to form a film carrying compartment, a film carried therein, means in said casing for viewing the film, means permitting finger engagement of the film to move the same within the range of the viewing means and removable guide means for said film in moving the same.

3. In a picture display device, a molded casing comprising a pair of correspondingly shaped members for fitting together to provide film carrying compartments at the top and bottom of said casing, a film carried therein, a film-lighting aperture at one side of the casing, and a film-viewing aperture at the other side thereof, guide means for the film in each of the compartments, a removable guide plate adjacent said lighting aperture to direct the film across said aperture, and means whereby said film may be gripped directly by the fingers to move said film from one compartment to another.

4. In a picture display device, a molded casing comprising a pair of correspondingly shaped members for fitting together to provide film-carrying compartments at the top and bottom of said casing, a film carried in said compartments, a film-lighting aperture at one side of the casing and a film-viewing aperture at the other side, a walled passage between said apertures intermediate said compartments, molded guideways in each compartment integral with the casing, and a removable guide plate at the lighting-aperture end of said passage, and means on said plate engaging the walls of the passage to position the plate to guide the film across said lighting aperture upon movement of said film.

OLIVER C. DENNIS.